United States Patent
Lim et al.

(10) Patent No.: US 10,116,942 B2
(45) Date of Patent: Oct. 30, 2018

(54) METHOD AND APPARATUS FOR DECODING A VIDEO USING AN INTRA PREDICTION

(71) Applicant: SK TELECOM CO., LTD., Seoul (KR)

(72) Inventors: Jeongyeon Lim, Seongnam-si (KR); Yunglyul Lee, Seoul (KR); Joohee Moon, Seoul (KR); Haekwang Kim, Seoul (KR); Byeungwoo Jeon, Seongnam-si (KR); Jongki Han, Seoul (KR); Ryeonghee Kwon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/966,597

(22) Filed: Apr. 30, 2018

(65) Prior Publication Data
US 2018/0249162 A1    Aug. 30, 2018

Related U.S. Application Data

(63) Continuation of application No. 15/170,853, filed on Jun. 1, 2016, now Pat. No. 9,986,245, which is a
(Continued)

(30) Foreign Application Priority Data

Jun. 30, 2011    (KR) .................. 10-2011-0065208

(51) Int. Cl.
*H04N 19/14*        (2014.01)
*H04N 19/46*        (2014.01)
(Continued)

(52) U.S. Cl.
CPC ......... *H04N 19/159* (2014.11); *H04N 19/103* (2014.11); *H04N 19/14* (2014.11);
(Continued)

(58) Field of Classification Search
USPC ...................... 375/240.01–240.29
See application file for complete search history.

(56) References Cited

U.S. PATENT DOCUMENTS 5,452,104 A *   9/1995  Lee ..................... G06T 9/40
                                              358/426.14
5,886,741 A     3/1999  Srivastava
(Continued)

FOREIGN PATENT DOCUMENTS

KR    1020080026463 A    3/2008
KR    1020100038060 A    4/2010
(Continued)

OTHER PUBLICATIONS

Korean Office Action dated Jul. 19, 2018 for corresponding Korean Application No. 10-2011-0065208.
(Continued)

*Primary Examiner* — Leron Beck
(74) *Attorney, Agent, or Firm* — Hauptman Ham, LLP

(57) ABSTRACT

A video decoding apparatus using an intra-prediction, performs a method including: reconstructing information on an intra-prediction mode of a current block to be decoded from a bitstream, wherein the current block is a square block; reconstructing transform block information from the bitstream and reconstructing transform coefficients corresponding to each of one or more transform blocks divided in a quad tree structure from the current block; and reconstructing the current block based on the information on the intra-prediction mode and the reconstructed transform coefficients of the transform blocks.

14 Claims, 9 Drawing Sheets

Related U.S. Application Data continuation of application No. 14/140,367, filed on Dec. 24, 2013, now Pat. No. 9,565,443, which is a continuation of application No. PCT/KR2012/005077, filed on Jun. 27, 2012.

(51) Int. Cl.
*H04N 19/103* (2014.01)
*H04N 19/147* (2014.01)
*H04N 19/159* (2014.01)
*H04N 19/176* (2014.01)
*H04N 19/182* (2014.01)

(52) U.S. Cl.
CPC ......... *H04N 19/147* (2014.11); *H04N 19/176* (2014.11); *H04N 19/182* (2014.11); *H04N 19/46* (2014.11)

(56) References Cited

U.S. PATENT DOCUMENTS

| | | | | |
|---|---|---|---|---|
| 7,764,738 | B2 | 7/2010 | Kim et al. | |
| 8,116,374 | B2* | 2/2012 | Gordon | H04N 19/159 375/240.12 |
| 8,576,097 | B2* | 11/2013 | Ugur | H04N 19/91 341/107 |
| 8,885,701 | B2* | 11/2014 | Saxena | H04N 19/105 375/240 |
| 9,047,667 | B2* | 6/2015 | Yie | G06T 9/004 |
| 2002/0176118 | A1* | 11/2002 | LaRocca | G06F 17/147 358/426.06 |
| 2005/0053151 | A1* | 3/2005 | Lin | H04N 19/52 375/240.23 |
| 2005/0169374 | A1* | 8/2005 | Marpe | H04N 19/176 375/240.16 |
| 2006/0008009 | A1 | 1/2006 | Bao et al. | |
| 2006/0017592 | A1* | 1/2006 | Shim | H04N 19/176 341/50 |
| 2007/0237221 | A1* | 10/2007 | Hsu | H04N 19/61 375/240.03 |
| 2008/0111722 | A1* | 5/2008 | Reznik | H03M 7/40 341/67 |
| 2008/0123736 | A1* | 5/2008 | Sekiguchi | H04N 19/176 375/240.01 |
| 2008/0123947 | A1* | 5/2008 | Moriya | H04N 19/105 382/166 |
| 2008/0165849 | A1* | 7/2008 | Moriya | H04N 19/52 375/240.15 |
| 2009/0067503 | A1 | 3/2009 | Jeong et al. | |
| 2009/0147849 | A1* | 6/2009 | Au | H04N 19/159 375/240.13 |
| 2009/0154567 | A1* | 6/2009 | Lei | H04N 19/46 375/240.24 |
| 2009/0161757 | A1 | 6/2009 | Yu et al. | |
| 2009/0274214 | A1* | 11/2009 | Yoon | H04N 19/159 375/240.16 |
| 2010/0061454 | A1* | 3/2010 | Park | H04N 19/176 375/240.12 |
| 2011/0243222 | A1* | 10/2011 | Choi | H04N 19/159 375/240.03 |
| 2011/0249721 | A1* | 10/2011 | Karczewicz | H04N 19/159 375/240.02 |
| 2012/0008683 | A1* | 1/2012 | Karczewicz | H04N 19/159 375/240.12 |
| 2012/0063515 | A1 | 3/2012 | Panchal et al. | |
| 2013/0016782 | A1* | 1/2013 | Sasai | H04N 19/197 375/240.13 |

FOREIGN PATENT DOCUMENTS

| | | |
|---|---|---|
| KR | 1020110065089 A | 6/2011 |
| WO | 2010039728 A2 | 4/2010 |

OTHER PUBLICATIONS

International Search Report dated Dec. 27, 2012, corresponding to International Application No. PCT/KR2012/005077.
Chinese Office Action dated Apr. 10, 2017 in connection with the counterpart Chinese Patent Application No. 201280032450.8.

* cited by examiner

METHOD AND APPARATUS FOR DECODING A VIDEO USING AN INTRA PREDICTION

CROSS-REFERENCE TO RELATED APPLICATION

The present application is a continuation of U.S. patent application Ser. No. 15/170,853 filed on Jun. 1, 2016, which a continuation of U.S. patent application Ser. No. 14/140,367 filed on Dec. 24, 2013, which is a continuation of PCT/KR2012/005077, filed Jun. 27, 2012, which is based on and claims priority to Korean Patent Application No. 10-2011-0065208, filed on Jun. 30, 2011. The disclosures of above-listed applications are hereby incorporated by reference herein in their entirety.

FIELD

The present disclosure relates to a method and an apparatus for performing an encoding/decoding a video using an intra prediction.

BACKGROUND

The statements in this section merely provide background information related to the present disclosure and do not constitute prior art.

Standardization of a new standard corresponding to High Efficiency Video Coding (HEVC) which is more excellent and outstanding above existing H.264/Advanced Video Coding (AVC) is being progressed by a joint team of Moving Picture Experts Group (MPEG) and Video Coding Experts Group (VCEG) which is called Joint Collaborative Team on Video Coding (JCT-VC).

HEVC uses a Coding Tree Block (CTB) as a basic encoding unit, and the CTB is defined by square shapes in different sizes. The CTB is commonly composed of a Coding Units (CUs). In HEVC, a basic unit of the prediction is defined as a Prediction Unit (PU), and one CU is divided into a plurality of blocks and then used for the prediction.

FIG. 2 is a diagram of typical PU types and a sequence of coding the PUs in a single CU.

Referring to FIG. 2, a skip mode is performed in the single CU having a size of 2N×2N followed by sequential predictions in an inter 2N×2N mode, inter 2N×N mode, inter N×2N mode, inter N×N mode, intra 2N×2N mode and then intra N×N mode. However, in all CUs except for the CU of size 8×8 (2N×2N), the encoding is performed in all PUs except for the inter N×N mode and the intra N×N mode. So the predictions in the inter N×N mode and the intra N×N mode are performed only for the CU of size 8×8.

A prediction method is largely classified into an intra predictive coding which performs the prediction by using a predicted value from an encoded block within a frame which is being encoded and an inter predictive coding which predicts a block of a current frame by estimating a motion from a previously reconstructed frame.

The intra prediction method includes a unified intra prediction method which performs the prediction in various directions by using previously encoded pixel values located in a left side, a lower left side, an upper left side, an upper side, or an upper right side of a current block to be encoded.

FIG. 3 is a diagram of typical directions of intra prediction modes.

Referring to FIG. 3, the intra prediction modes comprises a total of thirty five prediction modes including a DC (direct current) mode, a planar mode and angular modes having a total of thirty three prediction directions.

The inter predictive coding of the video uses a motion compensation which predicts a current block by partitioning an image frame and estimating a motion from a previously encoded frame.

When one predicted block is generated through the intra predictive coding or the inter predictive coding, a residual signal is generated by calculating a difference between original pixel values of the current block and predicted pixel values of the predicted block. Then, the residual signal is transformed to generate a frequency transform block which is then quantized to generate a frequency coefficient block.

As fore-mentioned in FIG. 2, a general video encoding apparatus calculates optimal units from various candidate PUs according to a Rate-Distortion (RD) cost optimization scheme, and then transmits information on a result generated by performing the encoding in the corresponding units to a video decoding apparatus.

The inventor(s) has experienced that a method of calculating RD costs for all PUs in a single CU is efficient as long as the last-place intra N×N mode in the prediction sequence is determined to be the optimal mode, but is inefficient in time when the first-place inter 2N×2N mode in the prediction sequence is determined as the optimal mode.

SUMMARY

In accordance with an aspect of the present disclosure, a method of decoding a video using an intra-prediction at a video decoding apparatus, comprises: reconstructing information on an intra-prediction mode of a current block to be decoded from a bitstream, wherein the current block is a square block; reconstructing transform block information from the bitstream and reconstructing transform coefficients corresponding to each of one or more transform blocks divided in a quad tree structure from the current block; and reconstructing the current block based on the information on the intra-prediction mode and the reconstructed transform coefficients of the transform blocks.

In some embodiments, the reconstructing of the transform block information comprises: reconstructing a split transform flag indicating whether a block corresponding thereto is divided into four equal-sized square blocks of a low layer in the quad tree structure; reconstructing a first chroma coded block flag and a second chroma coded block flag of the corresponding block, irrespectively of whether or not the split transform flag indicates that the corresponding block is divided. Herein, the first second chroma coded block flag indicates whether a first chrominance component of the corresponding block has at least one non-zero transform coefficient, and the second chroma coded block flag indicates whether a second chrominance component of the corresponding block has at least one non-zero transform coefficient; and when the split transform flag indicates that the corresponding block is not further divided, reconstructing a luma coded block flag indicating whether a luminance component of the corresponding block has at least one non-zero transform coefficient and identifying the corresponding block which is not further divided as one of the transform blocks, wherein, when the split transform flag indicates that the corresponding block is further divided, the luma coded block flag of the corresponding block is not reconstructed from the bitstream.

In accordance with an aspect of the present disclosure, a video decoding apparatus using an intra-prediction comprises a decoder, an inverse transformer, a predictor and an adder. The decoder is configured to reconstruct information on an intra-prediction mode of a current block to be decoded from a bitstream, the current block being a square block, and reconstruct transform block information from the bitstream and reconstruct transform coefficients corresponding to each of one or more transform blocks divided in a quad tree structure from the current block. The inverse transformer is configured to reconstruct residual signals by inversely transforming the transform coefficients corresponding to each of the transform blocks. The predictor configured to generate predicted pixels based on the information on the intra-prediction mode. The adder is configured to add the residual signals to the predicted pixels.

In some embodiments, the decoder is further configured to reconstruct a split transform flag indicating whether a block corresponding thereto is divided into four equal-sized square blocks of a low layer in the quad tree structure, and reconstruct a first chroma coded block flag and a second chroma coded block flag of the corresponding block, irrespectively of whether or not the split transform flag indicates that the corresponding block is divided. wherein, the first chroma coded block flag indicates whether a first chrominance component of the corresponding block has at least one non-zero transform coefficient, and the second chroma coded block flag indicates whether a second chrominance component of the block has at least one non-zero transform coefficient. The decoder is configured to, when the split transform flag indicates that the corresponding block is not further divided, reconstruct a luma coded block flag indicating whether a luminance component of the corresponding block has at least one non-zero transform coefficient and identify the corresponding block which is not further divided as one of the transform blocks. Herein, the decoder is configured not to reconstruct the luma coded block flag of the corresponding block from the bitstream when the split transform flag indicates that the corresponding block is further divided.

DETAILED DESCRIPTION

A video encoding apparatus and/or a video decoding apparatus according to one or more embodiments correspond(s) to a user terminal such as a PC (personal computer), notebook computer, PDA (personal digital assistant), PMP (portable multimedia player), PSP (PlayStation Portable), wireless communication terminal, smart phone, TV and the like. A video encoding apparatus and/or a video decoding apparatus according to one or more embodiments correspond(s) to a server such as an application server, service server and the like. A video encoding apparatus and/or a video decoding apparatus according to one or more embodiments correspond(s) to various apparatuses each comprising (a) a communication apparatus such as a communication modem and the like for performing communication with various types of devices or wired/wireless communication networks, (b) a memory for storing various programs and data that encode or decode a video or perform an inter/intra-prediction for encoding or decoding, and (c) a microprocessor to execute the program and perform calculation and controlling, and the like.

Further, a video encoded into a bitstream by the video encoding apparatus is transmitted in real time or non-real-time to the video decoding apparatus through wired/wireless communication networks such as the Internet, a wireless short distance communication network, a wireless LAN network, a WiBro (aka WiMax) network, a mobile communication network and the like or through various communication interfaces such as a cable, a Universal Serial Bus (USB) and the like. Then, the bitstream is decoded and reconstructed as a video in the video decoding apparatus.

In general, a video is formed of a series of pictures (also referred to herein as "images" or "frames"), and each picture is divided or partitioned into predetermined regions such as blocks. Each of the divided blocks is classified into an intra block or an inter block depending on encoding schemes. The intra-block refers to a block that is encoded based on an intra-prediction coding scheme. The intra-prediction coding scheme predicts pixels of a current block by using pixels of neighboring blocks that were reconstructed through encoding and decoding in a current picture to which encoding is to be performed, so as to generate a predicted block, and encodes pixel differences between the predicted block and the current block. The inter-block means a block that is encoded based on an inter-prediction coding scheme. The inter-prediction encoding scheme predicts a current block in a current picture by referring to at least one previous picture and/or at least one subsequent picture, so as to generate a predicted block, and encodes differences between the predicted block and the current block. Here, a frame that is referred to in encoding or decoding the current picture (i.e., current frame) is called a reference frame.

Figure 5:
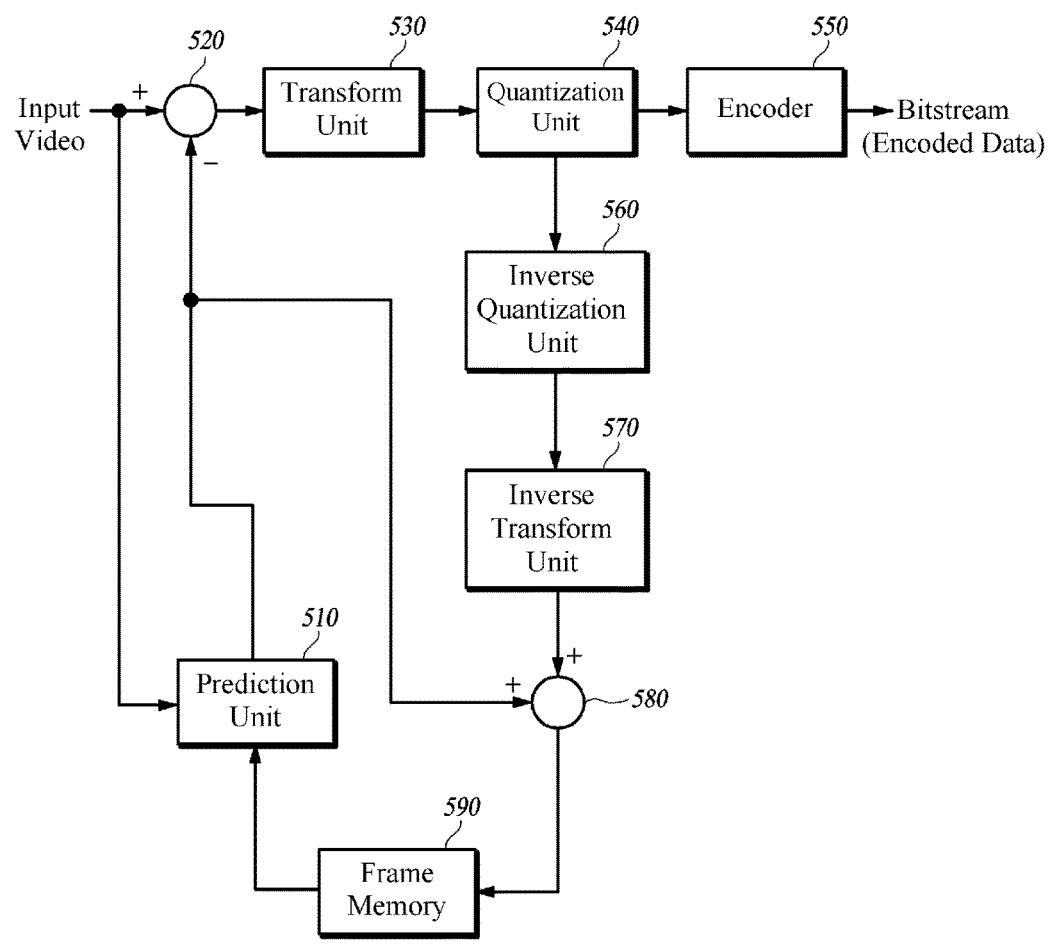
FIG. 5 is a schematic block diagram of a video encoding apparatus according to at least one embodiment of the present disclosure.

FIG. 5 is a schematic block diagram of a video encoding apparatus according to at least one embodiment of the present disclosure.

Configured according to at least one embodiment of the present disclosure to encode a video by generating a sub sample predicted value of a chrominance component by using a motion vector value of a luminance component of a current block of the video, a video encoding apparatus 500 comprises a predictor 510, a subtraction unit 520, a transformer 530, a quantization unit 540, an encoder 550, an inverse quantization unit 560 and an inverse transformer 570 as illustrated in FIG. 5. The video encoding apparatus 500 further comprises a frame memory 590. The predictor 510, the subtraction unit 520, the transformer 530, the quantization unit 540, the encoder 550, the inverse quantization unit 560 and the inverse transformer 570 are implemented by one or more processors and/or application-specific integrated circuits (ASICs).

Figure 1:
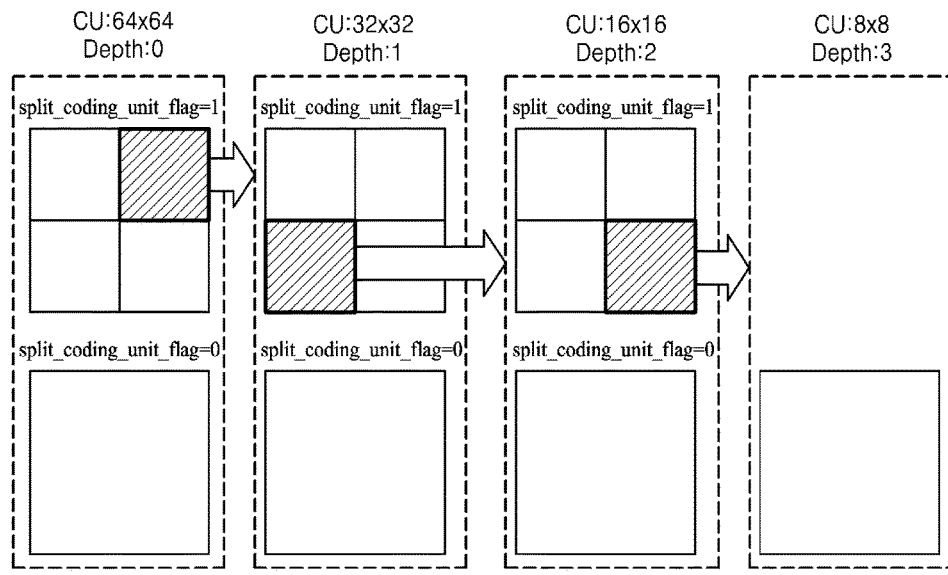
FIG. 1 is a diagram of sizes of a coding unit (CU) and a form of a quad tree.
Figure 1:
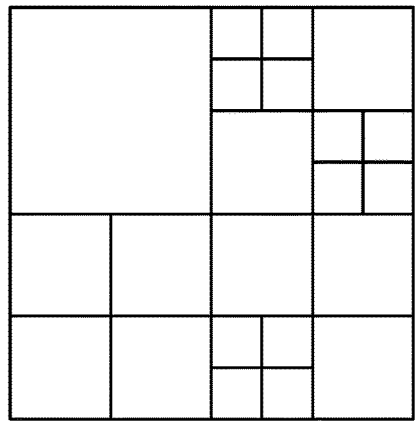

A video to be encoded is input in Coding Units (CUs), and the CUs take the form of N×N blocks where N has a size of $2^n$. Referring to FIG. 1, the CUs are in a form of a quad tree, where the encoding recursively performed from depth "0" with a CU size of 64×64 as a largest CU down to depth "3" where a CU has a size of 8×8.

Figure 2:
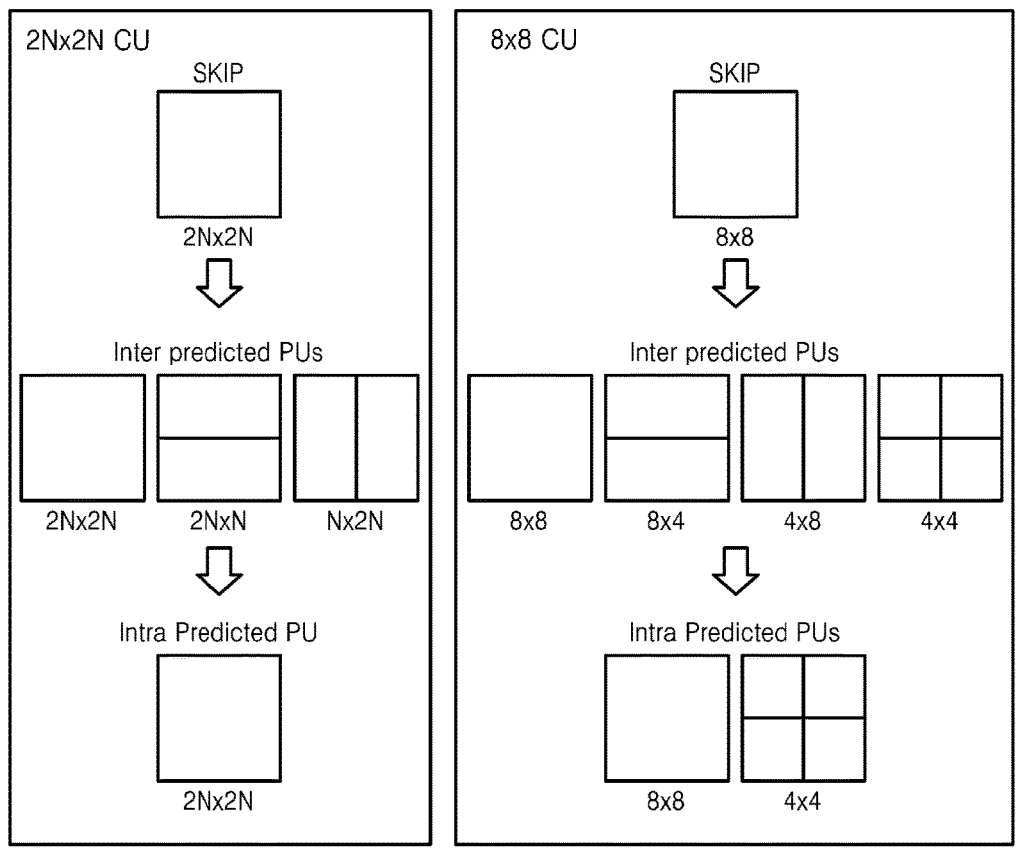
FIG. 2 is a diagram of types of prediction units (PUs) coded in a single coding unit (CU) and sequences of coding the PUs.
Figure 3:
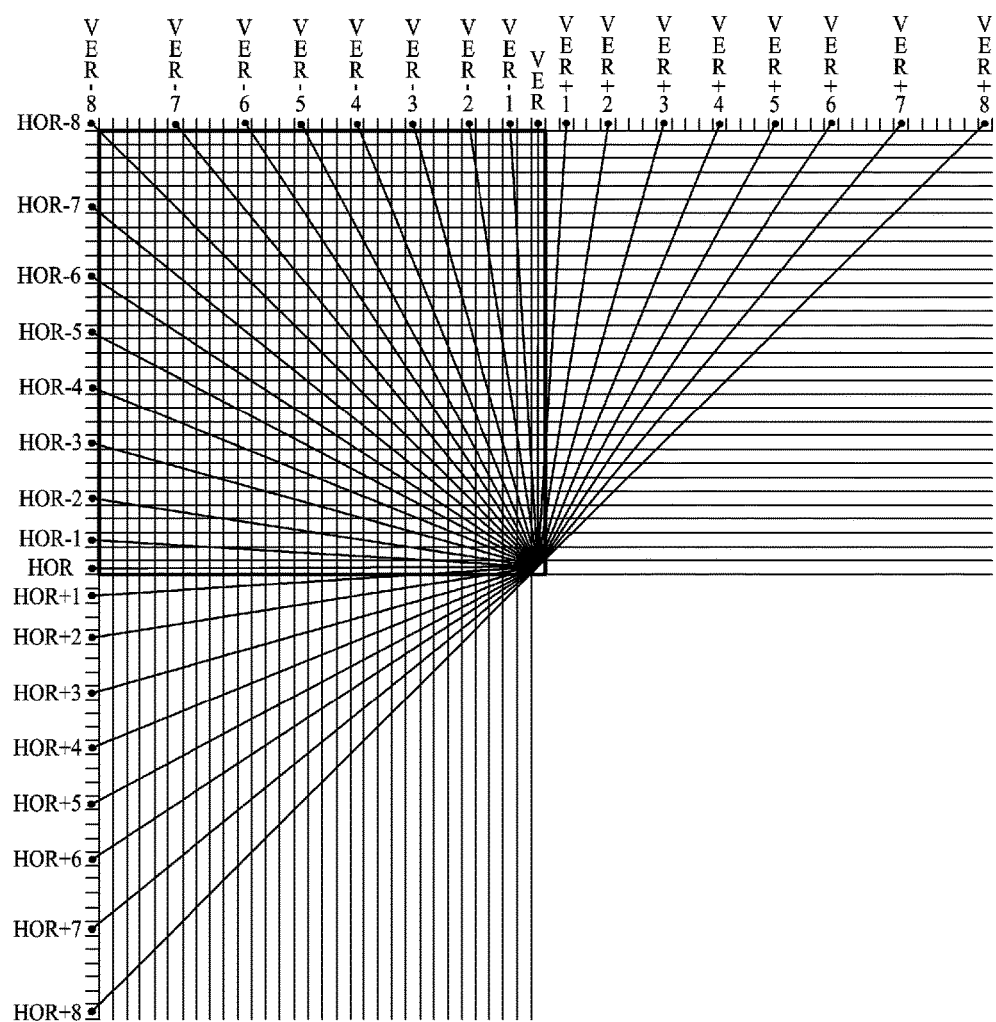
FIG. 3 is a diagram of directions of a general intra mode.

The prediction is performed in a Prediction Unit (PU) within one CU. In the encoder, the PU is in an N×M block form, and N and M have sizes of $2^n$ and $2^m$ (n>0 and M>0), respectively. Prediction modes or types within one CU include four inter PU types and two intra PU types as illustrated in FIG. 2. The coding is performed for all the PU types or prediction modes, and information on a PU type having the highest compression efficiency is transmitted to the video decoding apparatus.

Figure 7:
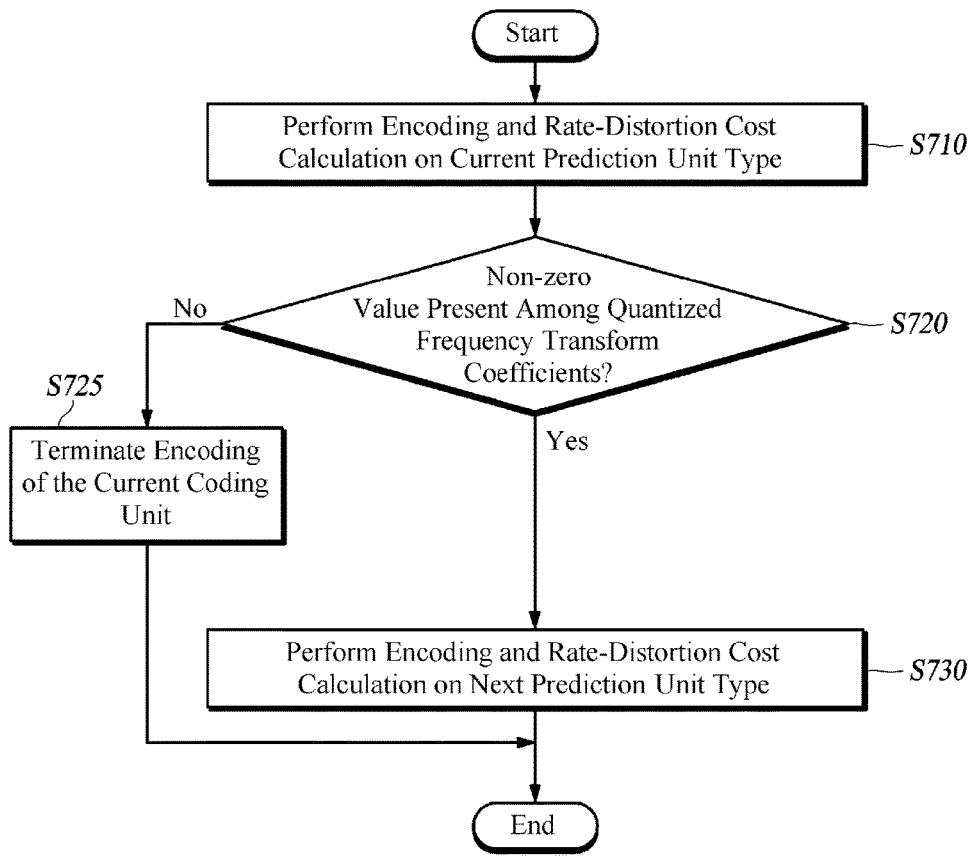
FIG. 7 is a flowchart of a PU decision within a CU according to at least one embodiment of the present disclosure.

FIG. 7 is a diagram illustrating a predictive encoding sequence.

The compression efficiency criteria is Rate Distortion (RD) cost including the number of bits required for transmitting video information and a difference value between an original block and a predicted block. As illustrated in FIG. 7, the RD cost for an encoding result of a current PU mode is calculated in step S710, and it is determined whether there is a non-zero value in quantized frequency transform coefficients in step S720. in case that all the quantized frequency transform coefficients of the coded PUs are "0", the RD cost is sufficiently low, and thus the encoding of the current CU is terminated (S725). Then, information on the PUs having the all-zero quantized frequency transform coefficients is transmitted to the video decoding apparatus. When there is any non-zero value in the quantized frequency transform coefficients, the encoding by next PU mode is performed and the RD cost is calculated in step S730.

The predictor 510 selects a prediction unit type for a current block (i.e., a current CU) among a plurality of prediction unit types, predicts the current block by the selected prediction unit type and generating one or more predicted blocks. That is, in order to predict a PU in a current CU, the predictor 510 generates a predicted block or blocks by using another frame or generates a predicted block or blocks by using pixel values in a left side and an upper side which are already encoded. In other words, while the predictor 510 in the intra prediction mode determines a prediction mode with information on previously encoded and reconstructed CUs of upper and left sides and generates predicted block or blocks by the prediction mode, the predictor 510 in the inter prediction mode generates prediction block or blocks by deriving a motion vector through a motion estimation on a previously encoded and reconstructed frame and by performing a motion compensation process using the generated motion vector.

The subtraction unit 520 generates a residual signal by calculating the difference between an original pixel value of each pixel of the current block and a predicted value generated by the predictor 510.

Figure 4:
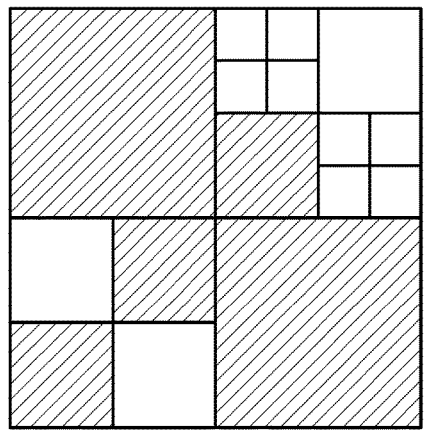
FIG. 4 is an exemplary diagram of a quad tree form of a transform unit (TU) and its relation between coded block flags (cbf) and a split transform flag.
Figure 4:
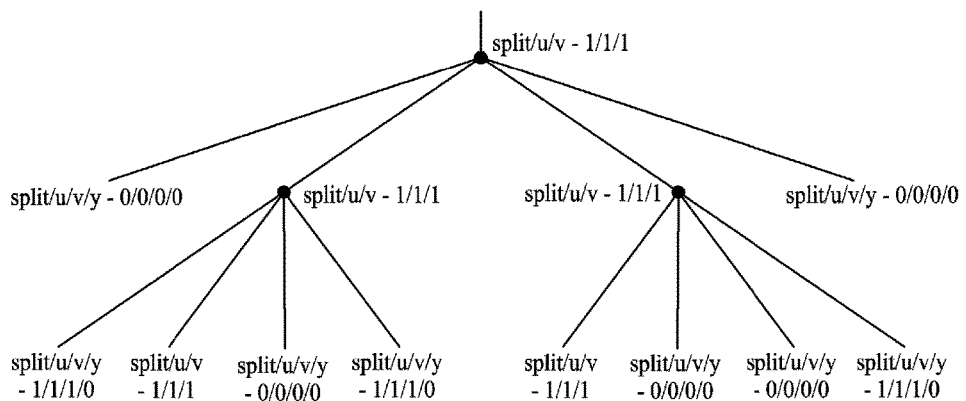

The transformer 530 transforms the residual signal generated by the subtraction unit 520 into a frequency domain. The transformer 530 performs the transform in a Transform Unit (TU). The TU is in an N×N block form and N has a size of $2^n$. The transform is sequentially performed for each TU just after the prediction is performed for the current PU or PUs by the transformer 530, and the sizes of the TUs are identical to or smaller than the size of the corresponding CU and irrelevant to the size of the corresponding PU. Referring to FIG. 4, The TUs form a quad tree, similar to that of the CU, where transforms are recursively performed from the size of the CU to a arbitrarily designated depth. At this time, information on a size of the TUs having the lowest RD cost is transmitted by a split transform flag for each depth of the TUs to the video decoding apparatus. When the split transform flag is "1", it means that the TU having the lowest RD cost goes lower in depth than the TU having a depth corresponding to the flag "1". Here, the transformer 530 can transform a residual signal into a frequency domain by using various transform schemes which transform a pixel signal on a time axis to a pixel signal on a frequency axis, such as Discrete Cosine Transform (DCT), wavelet transform and the like.

The quantization unit 540 quantizes a frequency transform block comprised of the residual signal transformed into the frequency domain by the transformer 530. At this time, for TUs of a luminance signal and a chrominance signal having all-zero quantized transform coefficients, a coded block flag (cbf) indicating that the coefficients are "0" is transmitted. The quantization is performed by using various quantization schemes such as Dead Zone Uniform Threshold Quantization (DZUTQ), quantization weighted matrix and the like.

The encoder 550 encodes a quantized frequency transform block including frequency coefficients quantized by the quantization unit 540 into a bitstream. The encoding is performed by using an entropy encoding technology, but the present disclosure is not limited thereto and uses various encoding schemes. Herein, the entropy encoding is a scheme that encodes a given set of symbols with the minimum number of bits to represent them.

In addition, the encoder 550 can insert various pieces of information required for decoding the encoded bitstream as well as the bitstream encoded from quantized frequency coefficients into encoded data. For examples of the various pieces of information, the encoder 550 encodes information indicating the prediction unit type for the current block into the bitstream. The encoder 550 encodes coded block information indicating whether the quantized frequency transform block of the current block has all zero coefficients into the bitstream. The encoder further encodes, into the bitstream, split information of the quantized frequency transform block and quantized transform coefficients when the coded block information does not indicate that the quantized frequency transform block has all zero coefficients. The encoder encodes a coded block flag (which is indicating whether the subblock has all zero coefficients) for a subblock divided from the quantized frequency transform block. The encoded data include a field containing a bitstream from encoding a Coded Block pattern (CBP), a delta quantization parameter, and the quantized frequency coefficients and another field containing bits for required predictive information of, for example, an intra-prediction mode in the intra-prediction or a motion vector in the inter-prediction.

An inverse quantization unit 560 reconstructs the frequency transform block by inversely quantizing the transformed and quantized residual block (that is, quantized transform block). An inverse transformer 570 reconstructs the residual block by inversely transforming the frequency transform block. Here, the inverse quantization and the inverse transform are achieved by inversely performing the transform process by the transformer 530 and the quantization process by the quantization unit 540, respectively. In other words, the inverse quantization unit 560 performs the inverse quantization and the inverse transform by using information (for example, information on types of transform and quantization) on the transform and quantization generated by and transmitted from the transformer 530 and the quantization unit 540.

An adder 580 generates a reconstructed block by adding the predicted block or blocks generated by the predictor 510 and the residual block reconstructed by the inverse transformer 570.

A frame memory 590 stores the block reconstructed by the adder 580, and the reconstructed block is used as a reference block to generate a predicted block in the intra or inter-prediction.

FIG. 7 is an exemplary process of encoding a plurality of PUs in a current CU and determining an optimal PU mode according to at least one embodiment of the present disclosure.

A performance of a PU is determined by an RD cost of equation (1).

$$RDcost = \text{Distortion} + \lambda \times \text{Rates} \quad \text{Equation (1)}$$

$$\text{where Distortion} = \sum_{k=0}^{M} \sum_{l=0}^{M} (B(k, l) - B'(k, l))^2$$

In Equation (1), the PU has a size of M×M for example and a distortion value of the RD cost in Equation (1) corresponds to a value generated by raising difference values between original pixel values and predicted values generated by the predictor 510 and then adding the values. In Equation (1), B (k, l) refers to an original pixel value of a (k, l) coordinate within the PU and B' (k, l) refers to a single predicted pixel value. In Equation (1), a value of Rates refers to a total number of encoded bits when one PU has passed through all of the predictor, the transformer, and the quantization unit. In other words, in an optimal PU, the difference between original pixel values and predicted pixel values is smallest among all available PUs. Also when an encoding process from the predictor to the quantization unit has been completed, the optimal PU has the smallest number of encoded bits.

Here, calculating the RD cost for each of PU modes enables an accurate comparison between PU modes, but it has a disadvantage of having a high calculation complexity due to the necessary encoding process for all PU modes.

When all quantized frequency transform coefficients for a PU mode in which encoding is completely performed are "0", bits are not spent in the encoding except for bits allocated to side information such as a motion vector and a prediction mode commonly included in all PU modes. Further, when all quantized frequency transform coefficients are "0", it means that residual signals before passing through the transformer and the quantization unit are sufficiently small. In other words, the RD cost for the PU mode having the all-zero quantized frequency transform coefficients is enough to be the optimal PU when compared with RD costs of other PU modes for the same CU. For example, in case that the predictor 510 predicts a current block by using a plurality of prediction unit types and generates one or more predicted blocks, when the quantized frequency transform block for one of the plurality of prediction unit types has all zero coefficients, the predictor 510 terminates predicting the current block by using the remainder of the plurality of prediction unit types and decides the prediction unit type with said all-zero coefficients as the prediction unit type for the current block.

According to the at least one embodiment, the encoding method or encoding apparatus as used herein terminates encoding the current CU when all quantized frequency transform coefficients become "0" as a result of the encoding for the current PU mode, thereby reduces calculation complexity.

Whether all the quantized frequency transform coefficients are "0" may be expressed by a coded block pattern (cbp) or a coded block flag (cbf). For example, the cbf At this time, there is an encoded cbf for each of luminance and chrominance components.

Figure 6:
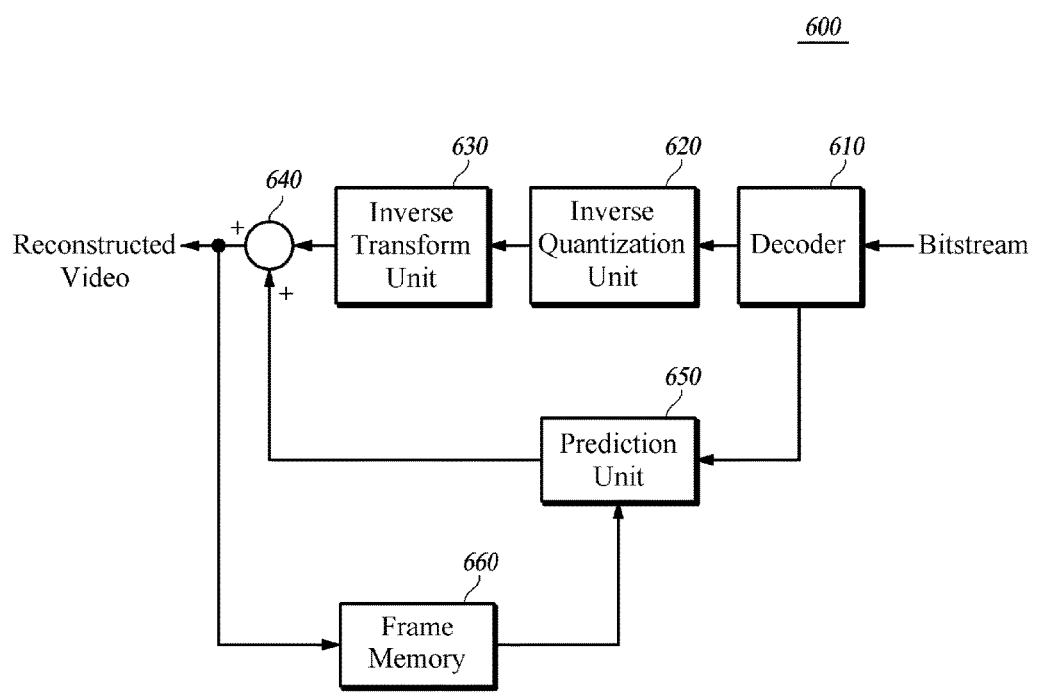
FIG. 6 is a schematic block diagram of a video decoding apparatus according to at least one embodiment of the present disclosure.

FIG. 6 is a block diagram of a configuration of the video decoding apparatus according to at least one embodiment of the present disclosure.

As illustrated in FIG. 6, a video decoding apparatus 600 according to an embodiment of the present disclosure is an apparatus capable of performing a decoding by using the quantized frequency transform signal of the current PU block or blocks of the video without an inverse quantization and inverse transform process of the signal and includes a decoder 610, an inverse quantization unit 620, an inverse transformer 630, an adder 640, and a predictor 650. The video decoding apparatus 600 further comprises a frame memory 660. The decoder 610, the inverse quantization unit 620, the inverse transformer 630, the adder 640, and the predictor 650 are implemented by one or more processors and/or application-specific integrated circuits (ASICs).

The decoder 610 decodes a bitstream to extract a quantized frequency transform block.

The decoder 610 can decode or extract pieces of information required for the decoding as well as the quantized frequency transform block by decoding encoded data. The pieces of information required for the decoding refer to pieces of information required for decoding an encoded bitstream within the encoded data (that is, the bitstream) and include, for example, information on sizes of the CU, PU, and TU, information on the cbp and cbf, information on a motion vector, information on a transform and quantization type and the like and also include various pieces of information other than the above listed information. In other words, for examples of the pieces of information required for the decoding, the decoder 610 obtains (or extracts) information indicating the prediction unit type by decoding encoded data. The decoder 610 obtains (or extracts) coded block information indicating whether the extracted quantized frequency transform block has all zero coefficients by decoding encoded data. The decoder 610 obtains (or extracts) split information of the quantized frequency transform block and quantized transform coefficients when the coded block information does not indicate that the quantized frequency transform block has all zero coefficients. The decoder 610 obtains (extracts) a coded block flag (which is indicating whether the subblock has all zero coefficients) for a subblock divided from the quantized frequency transform block.

In other words, the decoder 610 decodes the bitstream, which is the data encoded by the video encoding apparatus 500, extracts the quantized frequency transform block representing pixel information of the current block of the video, and transmits the extracted information required for the prediction to the predictor 650.

The predictor 650 can predict the current block in the same way as that of the predictor 510 of the video encoding apparatus 500 by using the information required for the prediction which is transmitted from the decoder 610.

The inverse quantization unit 620 inversely quantizes the quantized frequency transform block extracted from the bitstream by the decoder 610. The inverse transformer 630 inversely transforms the frequency transform block inversely quantized by the inverse quantization unit 620 into a time domain.

The adder 640 reconstructs original pixel values of the current block by adding the residual signal reconstructed by the inverse transformer 630 and the predicted pixel values generated by the predictor 650.

When all the quantized frequency transform coefficients of the extracted quantized frequency transform block are "0", that is, when quantized frequency transform coefficients of a block to be decoded is not included in the bitstream, a series of processes respectively implemented by the inverse quantization unit 620, the inverse transformer 630, and the adder 640 of the video decoding apparatus 600 are omitted, and the predicted pixel values generated by the predictor 650 is directly transmitted to the frame memory.

The current block reconstructed by the adder 640 or the predictor 650 is transmitted to the frame memory 660 and used for predicting another block by the predictor 650.

The frame memory 660 stores a reconstructed video to allow an intra-prediction block or an inter-prediction block to be generated.

According to one exemplary embodiment of the disclosure, the decoder 610 obtains information on a prediction unit type for a current block and a coded block flag indicating whether the current block has all zero transform coefficients. Depending on the value of the coded block flag obtained by the decoder 610 by decoding the bitstream, there are two independent processes to reconstruct the current block included in the decoded bitstream. Firstly, when the coded block flag indicates a first value, the predictor 650 generates one or more predicted blocks for the current block based on the prediction unit type, and reconstructs the current block directly from the one or more predicted blocks. Secondly, when the coded block flag indicates a second value, the predictor 650 generates one or more predicted blocks for the current block based on the prediction unit type. Split information of the current block from the bitstream is obtained by the decoder 610. One or more residual blocks are generated by inversely transforming transform coefficients of each of one or more transform units of size identified by the split information. And then the current block is reconstructed by using the one or more predicted blocks and the one or more residual blocks.

The video encoding apparatus and the video decoding apparatus according to at least one embodiment of the present disclosure are implemented by connecting a bitstream output terminal of the video encoding apparatus 500 of FIG. 5 with a bitstream input terminal of the video decoding apparatus 600 of FIG. 6.

The video encoding apparatus and the video decoding apparatus according to at least one embodiment of the present disclosure include a video encoder which generates a predicted block or blocks of a current block by using one Prediction Unit (PU) mode when encoding a current Coding Unit (CU), generates a residual block by subtracting the predicted block or blocks from the current block, generates a frequency transform block by transforming the residual block, generates a quantized frequency transform block by quantizing the frequency transform block, when the quantized frequency transform block does not include a non-zero value (i.e., when all the value of the quantized frequency transform block are "0"), omits the remainder of the prediction modes and then determines the PU of the current prediction mode as an optimal PU, and encodes a frequency transform block of the optimal PU into a bitstream; and a video decoder which generates a quantized frequency transform block from the bitstreams, when the quantized frequency transform block has a non-zero value, reconstructs a residual block by inversely quantizing and inversely transforming the quantized frequency transform block, generates a predicted block or blocks of a current block to be reconstructed, reconstructs the current block or blocks to be reconstructed by adding the reconstructed residual block and the generated predicted block(s), and when the entire quantized frequency transform block has zero values, reconstructs the current block or blocks to be reconstructed, only with a reference block referred to by a motion vector.

Here, the video encoder can be implemented by the video encoding apparatus 500 according to at least one embodiment of the present disclosure, and the video decoder can be implemented by the video decoding apparatus 600 according to at least one embodiment of the present disclosure.

Figure 8:
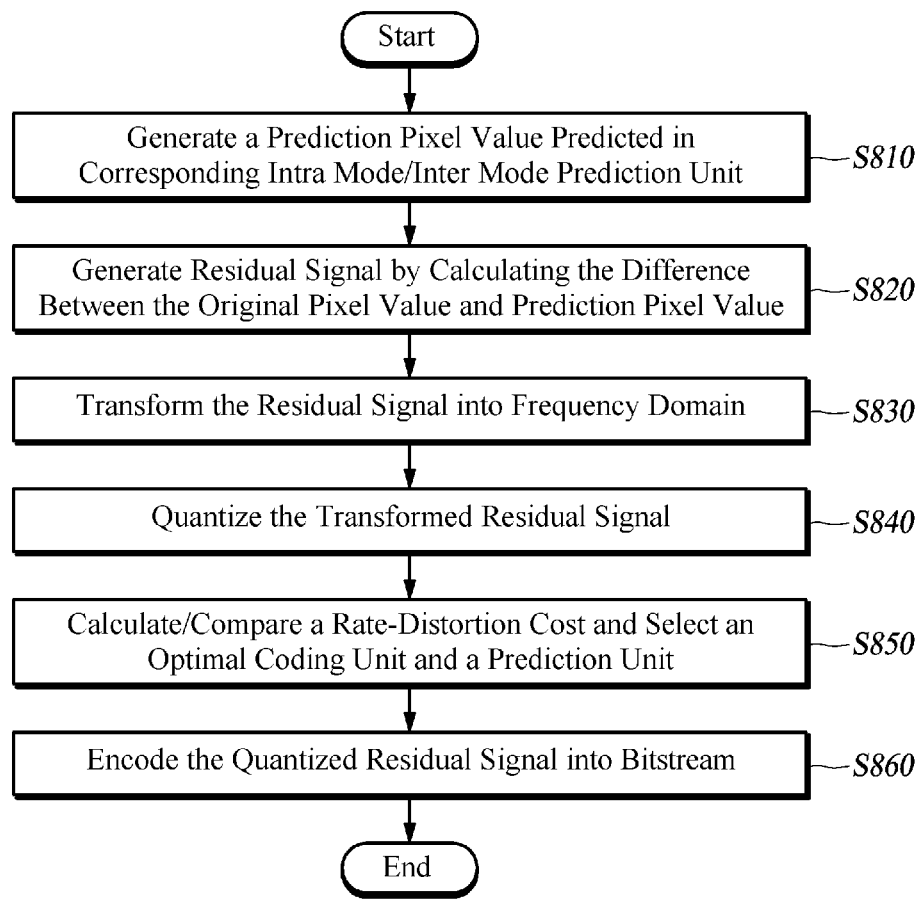
FIG. 8 is a flowchart of a video encoding method according to at least one embodiment of the present disclosure.

FIG. 8 is a flowchart of a video encoding method according to at least one embodiment of the present disclosure.

In other words, the video encoding apparatus 500 encodes a video through a prediction step 810 of generating predicted pixel values by using a motion vector value of a current block of a video, a subtraction step 820 of generating a residual signal by calculating difference values between original pixel values of the current block and the predicted pixel values, a transform step 830 of transforming the generated residual signal into a frequency domain by using DCT transform, wavelet transform or the like, a quantization step 840 of quantizing the residual signal transformed into the frequency domain, and an encoding step 850 of determining an optimal quantized frequency transform residual signal and encoding the optimal quantized frequency transform residual signal into a bitstream.

Here, since the prediction step 810 corresponds to a function of the predictor 510, the subtraction step 820 corresponds to a function of the subtraction unit 520, the transform step 830 corresponds to a function of the transformer 530, the quantization step 840 corresponds to a function of the quantization unit 540, and the encoding step 850 corresponds to a function of the encoder 550, respectively, detailed descriptions thereof will be omitted.

Figure 9:
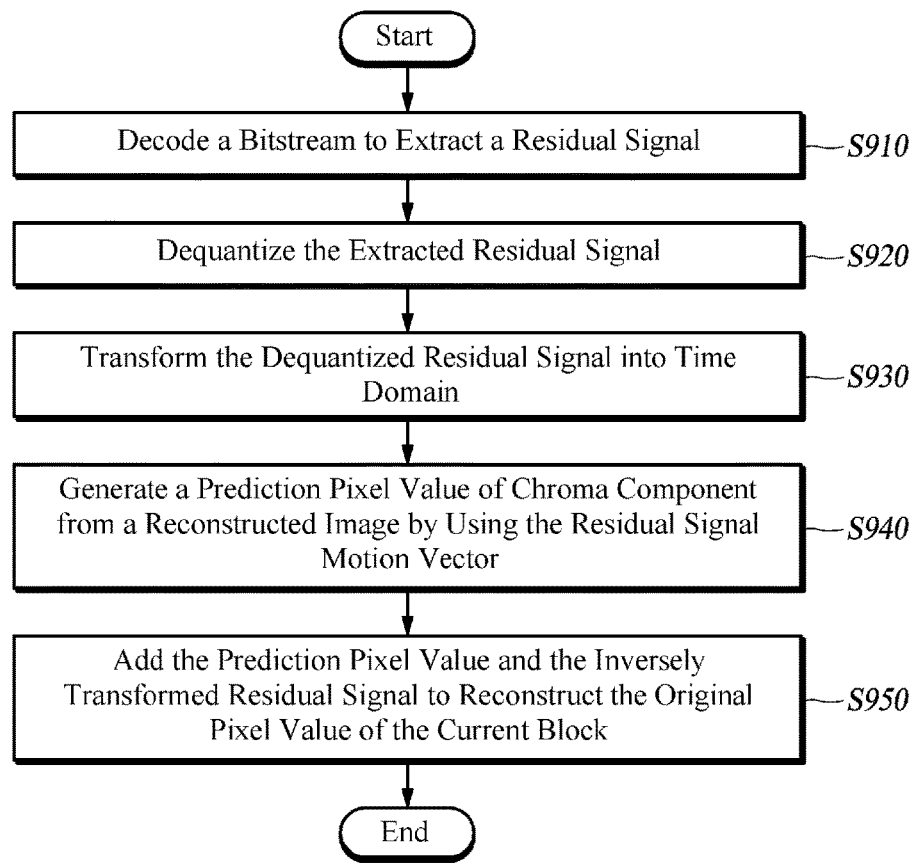
FIG. 9 is a flowchart of a video decoding method according to at least one embodiment of the present disclosure.

FIG. 9 is a flowchart of a video decoding method according to at least one embodiment of the present disclosure.

The video decoding apparatus 600, which receives the bitstream of the video through a wired or wireless communication network, a cable or the like and stores the received bitstream, generates predicted values by using a motion vector value of a current block of the video, and decodes and reconstructs video of original pixel values generated by adding an inversely quantized and inversely transformed residual signal only when a quantized frequency transform coefficient exists in order to reproduce the video according to an algorithm either of a program selected by a user or of another program under execution, Accordingly, the video decoding apparatus 600 decodes the transmitted bitstream through a decoding step S910 of extracting a quantized frequency transform residual signal indicating information on pixel values of a current block of the video by decoding the bitstream, an inverse quantization step S920 of inversely quantizing the quantized frequency transform residual signal, an inverse transform step S930 of inversely transforming the inversely quantized frequency transform residual signal into a time domain, the prediction step S940 of generating predicted values by using a motion vector value, and an addition step S950 of reconstructing an original pixel value of the current block by adding the residual signal of the current block reconstructed in step S930 and the predicted pixel value of each pixel of the current block predicted in step S940. In addition, the video decoding apparatus 600 decodes the transmitted bitstream through the prediction step S940 when there is no transmitted or quantized frequency transform residual signal.

Here, since the decoding step 910 corresponds to an operation of the decoder 610, the inverse quantization step 920 corresponds to an operation of the inverse quantization unit 620, the inverse transform step 930 corresponds to an operation of the inverse transformer 630, the prediction step 940 corresponds to an operation of the predictor 650, and the addition step 950 corresponds to an operation of the adder 640, detailed descriptions thereof will be omitted.

The video encoding method and the video decoding method according to at least one embodiment of the present disclosure is implemented by combining the video encoding method according to an embodiment of the present disclosure and the video decoding method according to an embodiment of the present disclosure.

The video encoding method and the video decoding method according to at least one embodiment of the present disclosure comprises encoding a video by generating a predicted block or blocks of a current block by using one Prediction Unit (PU) type when encoding a current Coding Unit (CU), generating a residual block by subtracting the predicted block or blocks from the current block, generating a frequency transform block by transforming the residual block, generating a quantized frequency transform block by quantizing the frequency transform block, when the quantized frequency transform block does not contain any non-zero value, omitting following prediction mode or PU types and then determining the PU type as an optimal PU type, and encoding a frequency transform block of the optimal PU into a bitstream; and decoding a video by generating a quantized frequency transform block from the bitstream, when the quantized frequency transform block has a non-zero value, reconstructing a residual block by inversely quantizing and inversely transforming the quantized frequency transform block, generating a predicted block or blocks of a current block to be reconstructed, reconstructing the current block to be reconstructed by adding the reconstructed residual block and the generated predicted block or blocks, and when the entire quantized frequency transform block has a zero value, reconstructing the current block to be reconstructed, only with a reference block referred to by a motion vector.

Here, the step of encoding the video is implemented by the video encoding step according to at least one embodiment of the present disclosure and the step of decoding the video is implemented by the video decoding step according to at least one embodiment of the present disclosure.

In the description above, although all of the components of the embodiments of the present disclosure have been explained as being assembled or operatively connected as a unit, one of ordinary skill would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art. The computer program is stored in a non-transitory computer readable media, which in operation realizes the embodiments of the present disclosure. The computer readable media includes magnetic recording media, optical recording media or carrier wave media, in some embodiments.

As described above, the present disclosure is highly useful for obtaining an effect of reducing calculation complexity of a CU by omitting an unnecessary encoding process through termination of an encoding of the CU after an encoding of a PU determined as an optimal PU without encodings of all PUs when one CU is encoded and an effect of reducing encoding time by omitting an unnecessary decoding process in a decoder.

Some embodiments as described above may be implemented in the form of one or more program commands that can be read and executed by a variety of computer systems and be recorded in any non-transitory, computer-readable recording medium. The non-transitory computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A method of decoding a video using an intra-prediction at a video decoding apparatus, comprising:
reconstructing information on an intra-prediction mode of a current block to be decoded from a bitstream, wherein the current block is a square block;
reconstructing transform block information from the bitstream and reconstructing transform coefficients corresponding to each of one or more transform blocks divided in a quad tree structure from the current block; and reconstructing the current block based on the information on the intra-prediction mode and the reconstructed transform coefficients of the transform blocks, wherein the reconstructing of the transform block information comprises:

reconstructing a split transform flag indicating whether a block corresponding thereto is divided into four equal-sized square blocks of a low layer in the quad tree structure;

reconstructing a first chroma coded block flag and a second chroma coded block flag of the corresponding block, irrespectively of whether or not the split transform flag indicates that the corresponding block is divided, wherein:

the first second chroma coded block flag indicates whether a first chrominance component of the corresponding block has at least one non-zero transform coefficient, and the second chroma coded block flag indicates whether a second chrominance component of the corresponding block has at least one non-zero transform coefficient; and when the split transform flag indicates that the corresponding block is not further divided, reconstructing a luma coded block flag indicating whether a luminance component of the corresponding block has at least one non-zero transform coefficient and identifying the corresponding block which is not further divided as one of the transform blocks, wherein, when the split transform flag indicates that the corresponding block is further divided, the luma coded block flag of the corresponding block is not reconstructed from the bitstream.

2. The method of claim 1, further comprising:

decoding, from the bitstream, block size information on a size of the current block; and determining the current block based on the block size information.

3. The method of claim 1, wherein the current block has a size ranging from 8×8 to 64×64.

4. The method of claim 1, further comprising:

dividing a largest coding unit in another quad tree structure by decoding a split coding unit flag from the bitstream; and identifying, as the current block, the block which is not further divided in said another quad tree structure.

5. The method of claim 1, further comprising:

reconstructing, from the bitstream, prediction unit information indicating one among a plurality of prediction unit types, wherein the reconstructing of the current block comprises:

predicting the current block by dividing the current block into one or more prediction units according to the prediction unit information.

6. The method of claim 5, wherein the plurality of prediction unit types include a 2N×2N type where the current block is not divided, and a N×N type where the current block is divided into four square prediction units.

7. The method of claim 1, wherein the first chroma coded block flag of the corresponding block is reconstructed, when the first chrominance component of an upper layer block from which the corresponding block is divided has at least one non-zero transform coefficient, and the second chroma coded block flag of the corresponding block is reconstructed, when the second chrominance component of the upper layer block has at least one non-zero transform coefficient.

8. A video decoding apparatus using an intra-prediction, comprising:

a decoder configured to reconstruct information on an intra-prediction mode of a current block to be decoded from a bitstream, the current block being a square block, and reconstruct transform block information from the bitstream and reconstruct transform coefficients corresponding to each of one or more transform blocks divided in a quad tree structure from the current block;

an inverse transformer configured to reconstruct residual signals by inversely transforming the transform coefficients corresponding to each of the transform blocks;

a predictor configured to generate predicted pixels based on the information on the intra-prediction mode; and an adder configured to add the residual signals to the predicted pixels, wherein the decoder is configured to reconstruct a split transform flag indicating whether a block corresponding thereto is divided into four equal-sized square blocks of a low layer in the quad tree structure, reconstruct a first chroma coded block flag and a second chroma coded block flag of the corresponding block, irrespectively of whether or not the split transform flag indicates that the corresponding block is divided, wherein:

the first chroma coded block flag indicates whether a first chrominance component of the corresponding block has at least one non-zero transform coefficient, and the second chroma coded block flag indicates whether a second chrominance component of the corresponding block has at least one non-zero transform coefficient, and when the split transform flag indicates that the corresponding block is not further divided, reconstruct a luma coded block flag indicating whether a luminance component of the corresponding block has at least one non-zero transform coefficient and identify the corresponding block which is not further divided as one of the transform blocks, wherein the decoder is configured not to reconstruct the luma coded block flag of the corresponding block from the bitstream when the split transform flag indicates that the corresponding block is further divided.

9. The apparatus of claim 8, wherein the decoder is configured to decode, from the bitstream, block size information on a size of the current block, and determine the current block based on the block size information.

10. The apparatus of claim 8, wherein the current block has a size ranging from 8×8 to 64×64.

11. The apparatus of claim 8, wherein the decoder is configured to divide a largest coding unit in another quad tree structure by decoding a split coding unit flag from the bitstream, and identify, as the current block, the block which is not further divided in said another quad tree structure.

12. The apparatus of claim 8, wherein the decoder is configured to reconstruct, from the bitstream, prediction unit information indicating one among a plurality of prediction unit types,
- wherein the predictor is configured to predict the current block by dividing the current block into one or more prediction units according to the prediction unit information.

13. The apparatus of claim 12, wherein the plurality of prediction unit types include a 2N×2N type where the current block is not divided, and a N×N type where the current block is divided into four square prediction units.

14. The apparatus of claim 8, wherein the decoder is configured to
- reconstruct the first chroma coded block flag of the corresponding block, when the first chrominance component of an upper layer block from which the corresponding block is divided has at least one non-zero transform coefficient, and
- reconstruct the second chroma coded block flag of the corresponding block, when the second chrominance component of the upper layer block has at least one non-zero transform coefficient.

\* \* \* \* \*